United States Patent [19]

Rakestraw et al.

[11] 3,719,733
[45] March 6, 1973

[54] METHOD FOR PRODUCING SPHERICAL PARTICLES HAVING A NARROW SIZE DISTRIBUTION

[75] Inventors: Lawrence F. Rakestraw, Raleigh; John W. Mottern, Cary, both of N.C.

[73] Assignee: Monsanto Company, St. Louis, Mo.

[22] Filed: Dec. 3, 1970

[21] Appl. No.: 94,712

[52] U.S. Cl. ...........................264/9, 264/12, 264/13
[51] Int. Cl. ...............................................B01j 2/04
[58] Field of Search.......................264/12, 13, 14, 9

[56] References Cited

UNITED STATES PATENTS

| | | | |
|---|---|---|---|
| 3,556,780 | 1/1971 | Holtz, Jr. | 264/12 |
| R22,494 | 6/1944 | Ferguson | 264/12 |
| 2,892,215 | 6/1959 | Naeser et al. | 264/9 |

FOREIGN PATENTS OR APPLICATIONS 712,699   7/1954   Great Britain..........................264/12

Primary Examiner—Robert F. White
Assistant Examiner—J. R. Hall
Attorney—Vance A. Smith, Russell E. Weinkauf, Jonn D. Upham and Neal E. Willis

[57] ABSTRACT

A method is provided for producing small diameter spherical particles in a narrow size distribution from low viscosity melts. Inert gas is constrained to uniformily envelope and move co-currently with a free stream extruded from the melt. The stream attenuates in diameter and disintegrates into spherical-like droplets under the influence of surface tension. The droplets quickly solidify into small diameter spherical particles having a narrow size distribution.

4 Claims, 4 Drawing Figures

INVENTORS
LAWRENCE F. RAKESTRAW
JOHN W. MOTTERN
BY Vance G. Smith
ATTORNEY

METHOD FOR PRODUCING SPHERICAL PARTICLES HAVING A NARROW SIZE DISTRIBUTION

BACKGROUND OF THE INVENTION

1. Field of the Invention

This invention relates to the field of producing small diameter spherical particles from low viscosity melts.

2. Discussion of the Prior Art

There is a growing need for powders, particularly metallic powders, in a number of applications. For example, free-flowing spherical powders are necessary in hard surfacing operations and also to facilitate automatic feeding in metal and ceramic spraying applications. There is a definite need for uniformily sized spherical powders in flame and arc spraying.

Generally the materials comprising the particles are normally solid at room temperature, i.e., about 25°C, and in the molten state have very low viscosities, usually below about 10 poises. Such materials are the metals, metalloids, salts, intermetallic compounds, and the low viscosity elements, compounds, and compositions which may be made molten and extruded as free stream. Many techniques have been devised to produce small particles from such materials. The techniques vary from pouring a molten stream of the material on a high speed rotating disk to atomizing the stream with a jet of gas. Although small in size, the resulting particles are generally not spherical and have a broad size distribution.

In still another technique, the material is extruded as a fine diameter molten stream. Since the molten stream has neglible viscosity, surface tension quickly augments the inherent disturbances in the stream configuration, causing the stream to disintegrate into discrete droplets which solidify into sphere-like shapes. It has been noted that the size distribution of the spherical particles utilizing the free streaming technique is again undesirably broad.

Another obvious disadvantage of the latter technique is the need to change the orifice plate each time particles having a different size distribution are required. When extremely small particles are needed, for example, particles with a diameter less than about 5 mils, manufacturing costs become high. The expense of producing orifice plates rapidly increases with diminishing orifice size.

As far as we have been able to ascertain, there are no prior art processes for the formation of small spherical particles with a large percentage (by weight) of the particles falling within a 100 micron diameter range while simultaneously maintaining the essentially spherical shape. An important object of the present invention is to provide an economical method by which the diameter of the particles may be varied while maintaining the narrow size distribution.

SUMMARY

When a molten stream of low viscosity is extruded through an orifice, a large variety of interactions between the stream and orifice are partially responsible for disturbances in the stream configuration. Friction between orifice wall and stream, minute changes in orifice diameter, wetting characteristics of the molten material, and occlusions in the molten material are all somewhat responsible for the disturbances. The magnitude of the disturbances vary considerably such that when the stream disintegrates due to augmenting action of surface tension, a population of spherical particles having a broad distribution of diameters are formed upon solidification.

We have devised a method by which the distribution of disturbance magnitudes occurring in the surface configuration of a free stream have been significantly narrowed. That is, the disturbances which result in the configuration of a stream when practicing a method of our present invention are essentially the same. This results in the formation of spherical particles having a narrow size distribution.

Briefly, in accordance with one aspect of the present invention, the molten material is extruded as a free stream. An essentially cylindrical, co-current flow of "inert" gas unreactive with the molten material is provided to envelope the issuing stream uniformly about its circumference. The "inert" gas generally has a velocity greater than the stream extrusion velocity but preferably less than the "sonic" velocity. By "inert" gas, we mean a gas which is substantially unreactive with the molten stream. The sonic velocity of a gas varies according to its composition. Helium, for example, has a sonic velocity of about 98,500 cm/sec. at standard temperatures and pressure.

For reasons not completely understood, the use of a co-current flow of inert gas is believed to narrow the distribution range of disturbance magnitudes and thus to allow surface tension to break-up the stream into droplets of essentially the same size. The low velocity flow of the inert gas avoids turbulence such as noted in atomizing techniques which utilize jets of gas significantly higher than sonic velocities. The velocity of the inert gas being greater than the stream extrusion velocity not only promotes narrow size distribution of particles, but also provides a stream attenuation greater than the attenuation which normally occurs due to the effect of gravity. This latter effect permits the use of a single orifice to obtain spherical particles of a desired size.

Other objects and advantages may be best understood from a reading of the following description and the accompanying drawings.

DESCRIPTION

It is known that when a liquid of low viscosity is extruded as a free stream that the stream inherently has minute disturbances in its surface configuration. The disturbances are caused by many factors such as orifice geometry, occlusions within the stream, turbulence due to stream interaction with surrounding gases, stream velocity profile due to friction with the orifice material, wetting characteristics of the molten material and orifice, etc. Left unaffected, the disturbances augmented by the surface tension of the molten material, grow in size and propagate along the stream. In a very short time interval, less than a second, the stream disintegrates into myriads of droplets which tend to assume a spherical shape and solidify. Because the disturbances have a broad distribution of magnitudes, the spheres have a broad distribution of sizes.

We have found that the present invention may be practiced on a variety of materials such as metals, metalloids, metal oxides, intermetallic compounds, salts and other normally solid materials having low viscosity melts. While we do not wish to limit ourselves to a particular material, in the interest of clarity the following description utilizes the metals, particularly copper, as working examples of normally solid materials with low viscosity melts.

Figure 1:
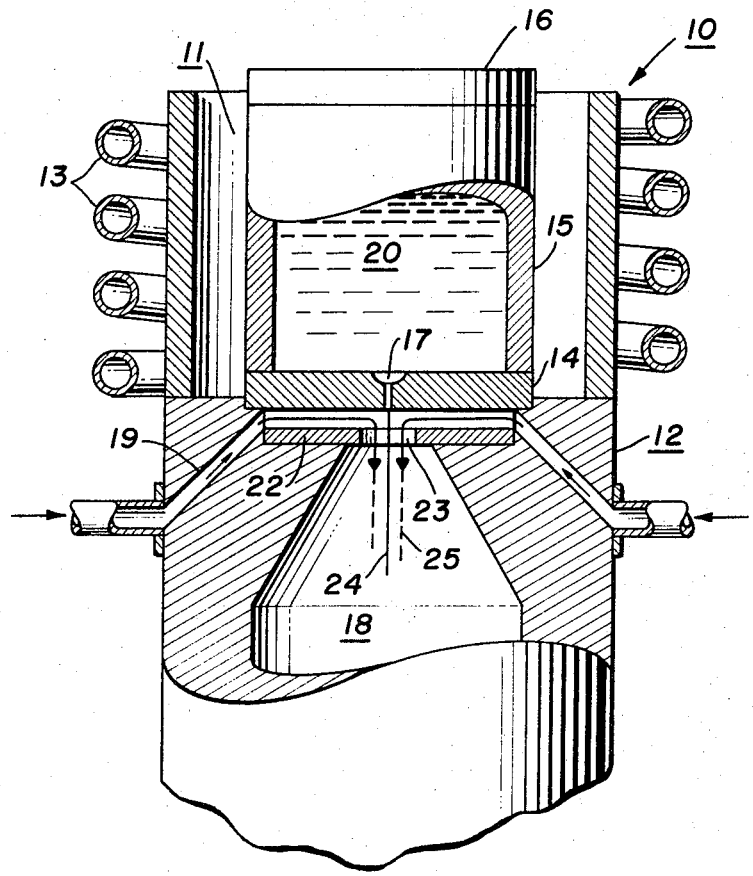
FIG. 1 is a vertical cross-section of an extrusion apparatus which may be used in accordance with the present invention.

FIG. 1 illustrates an apparatus for carrying out the method of the invention which we have successfully employed in the formation of spherical particles having a narrow size distribution. The apparatus is comprised of three major sections: a cylindrically-shaped susceptor 10; the crucible assembly 11; and pedestal assembly 12. Pedestal assembly 12 supports both susceptor 10 and crucible assembly 11. An inductor coil 13 is helically wound about susceptor 10 and is coupled to an appropriate power source (not shown). Alternatively, resistance heating may be used.

Crucible assembly 11 positioned within susceptor 10 is comprised of a base or orifice plate 14, cylindrical upright walls 15, and a removable gas-tight cap 16. Although not shown, cap 16 is generally provided with entrances for both an inert gas and material feed. Plate 14 contains an orifice 17. Pedestal assembly 12 not only acts as supporting means but also provides gas-tight chamber 18 and inert gas channels 19. Chamber 18 is also gas tight.

The composition of the various parts of the extrusion assembly depends largely on the compatibility with the material to be extruded. Thus, for high temperature molten metals, it is necessary that high melting point compositions such as a ceramic by employed, particularly where the parts come in contact with the molten material. It is also essential that parts be relatively inert in the presence of the molten material.

The general operation of the extrusion assembly is simple. A quantity of material is fed into crucible assembly 11. Inductor coils 13 provide an electric field which causes susceptor 10 and, consequently, crucible assembly 11 to heat up thereby forming melt 20. Gaseous pressure above melt 20 extrudes melt 20 through orifice 17 as a free stream 21 into chamber 18. The stream rapidly breaks up into droplets which, in the case of normally solid materials, quickly solidifies into particles.

Figure 2:
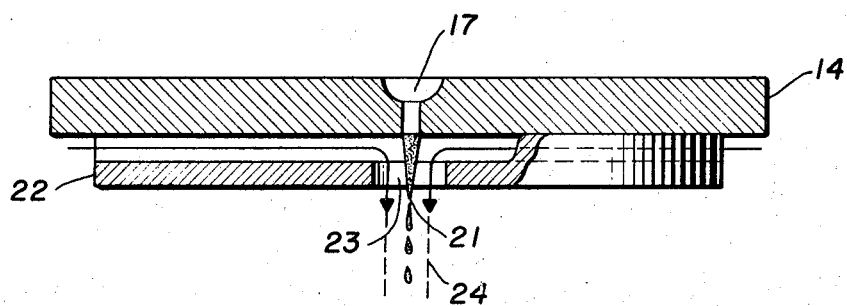
FIG. 2 is an enlarged view of the orifice and gas plates of FIG. 1.

The above-described apparatus, however, does not by itself produce spherical particles having a narrow size distribution. To accomplish this, a plate 22 is positioned below orifice plate 14 with throat 23 of plate 22 being substantially co-axially aligned with orifice 17. A predetermined flow-rate of inert gas is introduced through channels 19 between plates 14 and 22. The gas is constrained to flow in a radially inward direction by adjacent plates 14 and 22 toward throat 23. This may be seen best in the expanded view of plates 14 and 22 furnished by FIG. 2. The gas then exits at throat 23, uniformily enveloping molten stream 21 due to its radial flow and throat 23, forming a cylindrical shell 24 (seen in dotted outline) about the stream, and then moving co-currently with the stream.

It is desirable that the uniform and cylindrical flow of the inert gas extend from the orifice exit to a point at which the stream breaks into droplets due to surface tension. Stream breakup ordinarily occurs at a distance of 100 $d$ to 200 $d$ below the orifice where $d$ is the diameter of the orifice. Constraint of the inert gas in cylindrical form may be accomplished by providing plate 22 with a throat 23 which extends to a distance 100 $d$ to 200 $d$ below plate 14. Thus, longer throats are not needed.

Atomization techniques use jets of gas from 90 psi up to destroy the stream continuity. Such pressures results in velocities significantly higher than sonic velocities. In contrast, gas velocities employed in the present invention are generally subsonic since we have noted that gases at sonic velocities or greater have a deleterious effect upon stream continuity. Thus, for melt extrusion velocities of 100 to 2,000 cm/sec. the inert gas velocity of helium, for example, may, at a temperature of 1400°C range from a value somewhat greater than the extrusion velocity to velocity of around 220,000 cm/sec. It should be noted that the velocities employed for optimum conditions will vary according to the type of inert gas used and its temperature.

We have also noted that the thickness of the gas shell has an influence on the uniformity of gas flow. Thus, to avoid gas turbulence, we have found it desirable to limit the thickness of the gas shell to less than about 30 times the orifice diameter with the lower limit being about the same as the orifice diameter. One way in which this may be accomplished is by providing a throat which has a diameter 1 to 30 times the orifice diameter.

To attain the results in the following Tables, an apparatus similar to that of FIG. 1 was used. A charge of copper was made molten and then extruded through a 5 mil orifice. The spinning and gas pressure were varied as shown in the Tables. The plate throat diameter was about 20 mils and aligned coaxially with the orifice. The stream disintegrated into droplets and solidified into a quantity of spherical particles. A screen analysis was conducted on each group of particles to determine the percent (by weight) of particles in each size range. For clarity, the mesh size of the screen was converted into microns. Table 1 represents a neglible flow of inert gas compared to the sonic velocity of helium at 1,400°C of 220,000 cm/sec. For heavier gases such as argon or nitrogen, the velocity required is considerably less.

TABLE 1

| | |
|---|---:|
| Spinning Pressure | 30 psig. |
| Inert gas pressure | 0.5 psig. |
| Extrusion velocity | 706 cm/sec |
| Inert gas velocity | 44,000 cm/sec |

| Particle Size (Microns) | Percent (by weight) |
|---|---|
| under 355 | 2 |
| 355–425 | 12 |
| 425–500 | 43 |
| 500–600 | 43 |

TABLE 2

| | |
|---|---:|
| Spinning Pressure | 30 psig. |
| Inert gas pressure | 8.0 psig. |
| Extrusion velocity | 610 cm/sec |
| Inert gas velocity | 176,000 cm/sec |

| Particle Size (Microns) | Percent (by Weight) |
|---|---|
| 155-205 | 28 |
| 205-300 | 54 |
| 300-425 | 15 |
| 425-500 | 3 |

TABLE 3

| Spinning Pressure | 30 psig. |
|---|---|
| Gas pressure | 12 psig. |
| Extrusion velocity | 552 cm/sec |
| Gas velocity | 215,000 cm/sec |

| Particle Size (Microns) | Percent (by weight) |
|---|---|
| 155-205 | 55% |
| 205-250 | 39% |
| 250-300 | 6% |

It is important to note the distinctions between the results obtained. For example, in Table 1, the majority of particles are between 425 to 600 microns, a range of 175 microns. In table 2, over half of the particles are between 200-300 microns in size. A dramatic peaking of the distribution may be seen in Table 3 where 65 percent of all particles are between 155-205 microns and about 94 percent between 155-250 microns. Examination of the particles revealed that the shapes were essentially spherical.

Figure 3:
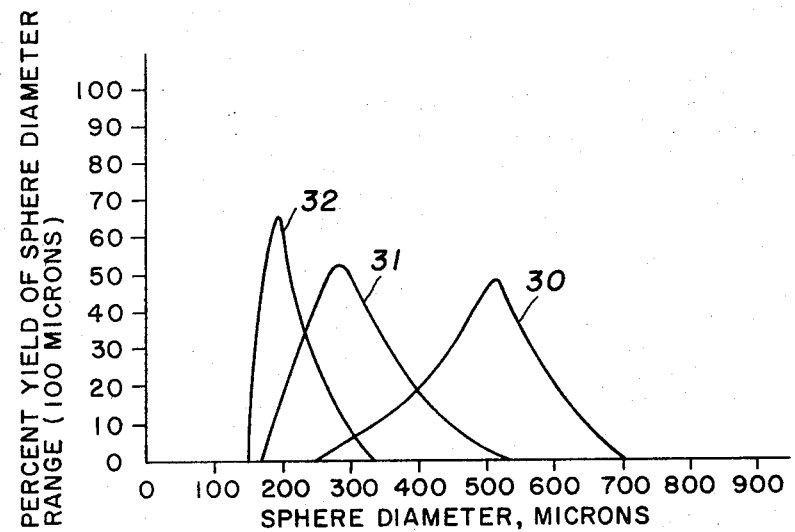
FIGS. 3 and 4 are graphs depicting comparative screen analysis data.

To better illustrate these comparative results of Tables 1, 2, and 3, reference is now made to the graph of FIG. 3. Curves 30, 31, and 32 were constructed by using as coordinates the midpoint of each size range as attained from the screen analysis and the corresponding percentage of particles within the particular size range. With increasing inert gas pressure below the orifice and therefore velocity, there is both a significant shift toward smaller particle size but also a pronounced narrowing and peaking of the distribution of particles. For example, curve 30 depicts a size distribution from about 300 to 600 microns with a peak percentage appearing in the 500 microns range. On the other hand, curves 31 and 32 depict smaller distributions with higher peaks. Thus, the effect of the co-current flow of inert gas is significant both in narrowing the distribution size and shifting the peak distribution.

Tables 4-6 tabulate the screening analysis results for a higher spinning pressure (and high extrusion velocity) for varying inert gas pressures.

TABLE 4

| Spinning Pressure | 40 psig. |
|---|---|
| Inert gas pressure | 2.5 psig. |
| Extrustion velocity | 796 cm/sec |
| Inert gas velocity | 155,000 cm/sec |

| Particle Size (Microns) | Percent (by weight) |
|---|---|
| 355-420 | 10 |
| 420-500 | 34 |
| 500-595 | 45 |
| 595-700 | 11 |

TABLE 5

| Spinning Pressure | 40 psig. |
|---|---|
| Inert gas pressure | 8.3 psig. |
| Extrusion velocity | 732 cm/sec |
| Inert gas velocity | 179,000 cm/sec |

| Particle Size (Microns) | Percent (by weight) | |
|---|---|---|
| 150-205 | 25 | |
| 205-250 | 26 | 51 |
| 250-295 | 24 | |
| 295-355 | 15 | |
| 355-420 | 6 | |
| 420-500 | 4 | |

TABLE 6

| Spinning Pressure | 40 psig. |
|---|---|
| Inert gas pressure | 12 psig. |
| Extrusion velocity | 810 cm/sec |
| Inert gas velocity | 215,000 cm/sec |

| Particle Size (microns) | Percent (by weight) |
|---|---|
| 150-205 | 69 |
| 205-250 | 23 |
| 250-295 | 5 |
| 295-350 | 3 |

Figure 4:
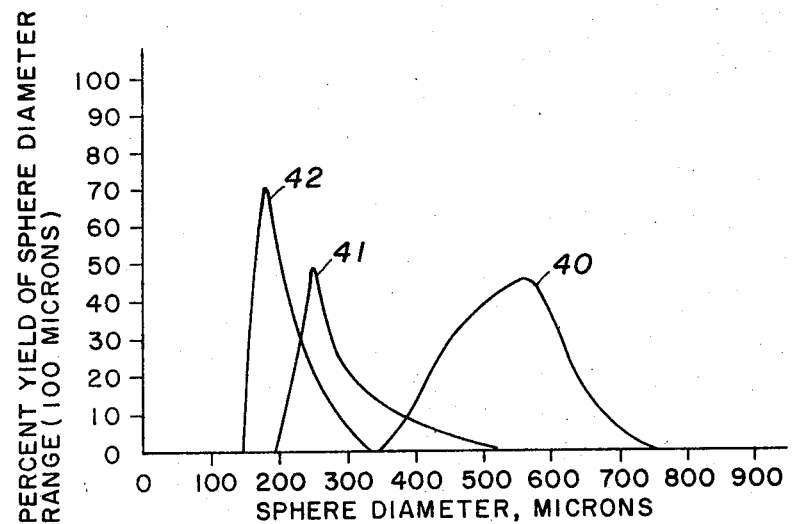

Table 6 shows that 92 percent of the particles formed in this run fell between 150-250 microns. This should be contrasted to the results obtained for Table 4 whereupon 45% were obtained between about 500-595 microns. FIG. 4 depicts a family of curves 40, 41, 42 generated from the data in Tables 4, 5, and 6, respectively, and similar to those of FIG. 3. Again, due to the increase in inert gas velocity, there is a pronounced shifting to smaller particle sizes, and narrowing and peaking of the particle distribution. Examination of the particles revealed that they had essentially spherical shapes.

In summary, it may now be seen that we have been able to fabricate spherical particles which are within a narrow size range through the practice of a novel method in accordance with the present invention. Inert gas is constrained to flow co-currently in cylindrical form about the stream while maintaining the velocity of the gas greater than the stream velocity but less than a velocity which would substantially effect the stream due to aerodynamic phenomena. Preferably, the velocity of the inert gas is kept below its sonic velocity. The cylindrical shape is preferably maintained until the stream has broken up into particles due to the augmenting effect of surface tension. This distance ranges from about 100 to 200 times the diameter of the extrusion orifice.

As stated hereinbefore, it is cumbersome and expensive to continually change the orifice plate when different size spherical particles are needed. Similarly, it is expensive to fabricate small particles since it is necessary to use orifices of small diameter. In accordance with the present invention, attenuation of the stream diameter may be closely controlled through predetermined variations in the velocity of the inert gas. Thus, the peak size distribution of the spherical particles may also be varied as desired as illustrated by FIGS. 3 and 4 without changing the size of the orifice.

Although copper was employed to demonstrate the formation of particles, it is to be understood that other normally solid materials with low viscosity melts such as those named herein may be used when practicing the present invention. It is to be understood that alterations, changes, and modifications may be made by those skilled in the art after a reading of the descriptive matter contained herein yet fall within the scope of the invention as defined by the following claims:

What is claimed is:

1. A method for forming spherical particles from a normally solid material having a viscosity of less than about 10 poises in the molten phase comprising
   a. extruding said material in the molten phase through an orifice as a free stream;

b. enveloping the said stream with a cylindrically shaped coecurrent flow of inert gas immediately upon emergence of the said stream from the said orifice such that velocity of the said inert gas is greater than the extrusion velocity of the said stream causing the said stream to attenuate, c. allowing the stream to disintegrate into droplets due to the effect of surface tension, and d. freeze as solid spherically shaped particles.

2. The method of claim 1 in which the inert gas velocity is less than its sonic velocity.

3. The method of claim 1 in which the thickness of the inert gas envelope is maintained between 1 and 30 times the orifice diameter.

4. The method of claim 1 in which the cylindrical flow of inert gas is maintained from the orifice to a point therebelow a distance 100 to 200 times the orifice diameter.

* * * * *